(12) United States Patent
Kayukawa

(10) Patent No.: US 7,174,910 B2
(45) Date of Patent: *Feb. 13, 2007

(54) VALVE CORE

(75) Inventor: Hisashi Kayukawa, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 415 days.

This patent is subject to a terminal disclaimer.

(21) Appl. No.: 10/814,901

(22) Filed: Mar. 31, 2004

(65) Prior Publication Data

US 2004/0261848 A1 Dec. 30, 2004

(30) Foreign Application Priority Data

Jun. 26, 2003 (JP) .............................. 2003-182058

(51) Int. Cl.
*F16K 15/20* (2006.01)
(52) U.S. Cl. ............................... 137/234.5; 137/454.5; 137/541
(58) Field of Classification Search ................ 137/223, 137/234.5, 454.5, 541; 152/415, 427, 429, 152/DIG. 11
See application file for complete search history.

(56) References Cited

U.S. PATENT DOCUMENTS

| | | | | |
|---|---|---|---|---|
| 1,649,321 A | * | 11/1927 | Overlander | .................. 137/223 |
| 1,714,392 A | | 5/1929 | Meek | |
| 1,917,499 A | * | 7/1933 | Conrad | .................... 137/234.5 |
| 2,126,845 A | | 8/1938 | Wahl | |
| 2,188,713 A | | 1/1940 | Gora | |
| 2,240,096 A | | 4/1941 | Gora | |
| 3,207,172 A | * | 9/1965 | Steer et al. | ............... 137/234.5 |
| 3,310,064 A | | 3/1967 | Voos | |
| 3,561,467 A | * | 2/1971 | Lutz | ......................... 137/234.5 |
| 4,462,449 A | * | 7/1984 | Zabel, Jr. | .................. 137/234.5 |
| 5,172,720 A | * | 12/1992 | Richards | ................... 137/454.5 |

(Continued)

FOREIGN PATENT DOCUMENTS

GB 1 358 464 A 7/1974

(Continued)

OTHER PUBLICATIONS

Chinese Office Action issued Aug. 4, 2006, 7 pages (English translation attached-3 pages).

*Primary Examiner*—John Rivell
(74) *Attorney, Agent, or Firm*—Akin Gump Strauss Hauer & Feld, LLP

(57) ABSTRACT

A valve core for opening and closing a core mounting throughbore includes a cylindrical core body fixed inside the throughbore and having a distal opening, a moving shaft inserted through the core body so as to be directly moved and having an end, a plug formed integrally at the end side of the moving shaft so as to open and close the distal opening of the core body, a biasing member biasing the moving shaft so that the distal opening of the core body is closed by the plug, a cylindrical sealing member, an outer sealing portion formed integrally on the cylindrical sealing member and fitted with the outer periphery of the core body so as to be held between the core body and the inner wall of the throughbore thereby to adhere closely to the outer periphery of the core body, and an inner sealing portion formed integrally on the cylindrical sealing member so as to adhere closely to an outer face of the plug.

26 Claims, 12 Drawing Sheets

U.S. PATENT DOCUMENTS 6,050,295 A * 4/2000 Meisinger et al. .......... 137/541
6,719,003 B2 * 4/2004 Schroeder et al. ....... 137/234.5

FOREIGN PATENT DOCUMENTS

| JP | 2000213833 | 8/2000 |
| JP | 2002-340206 A | 11/2002 |
| KR | 1996-0004540 | 6/1996 |

\* cited by examiner

PRIOR ART

VALVE CORE

BACKGROUND OF THE INVENTION

1. Field of the Invention

This invention relates to a valve core inserted into and fixed in a throughbore formed in a valve stem communicating with an interior of a tire of an automobile, for example.

2. Description of the Related Art

FIG. 12 illustrates one of conventional valve cores which is disclosed in JP-A-2002-340206. The disclosed valve core 1 comprises a core body 2, a moving shaft 3 inserted through the core body and having an end, and a disc-shaped rubber plug 4 fixed to the end side of the moving shaft. A compression coil spring 5 is provided in the core body 2 to bias the moving shaft 3 toward one side, so that the rubber plug 4 is usually pressed against an edge of a distal opening 8 of the core body 2. A sealing material 6 is provided on an outer periphery of the core body 2 to close a gap between an inner wall of a core mounting throughbore (not shown) and the outer periphery of the core body.

Cost reduction has recently been quite keen in the field of valve cores. The number of parts of the above-described valve core 1 has been reduced for the purpose of cost reduction in the valve cores.

SUMMARY OF THE INVENTION

Therefore, an object of the present invention is to provide a valve core which can reduce the number of parts as compared with the conventional valve cores.

The present invention provides a valve core for opening and closing a core mounting throughbore, comprising a cylindrical core body fixed inside the throughbore and having a distal opening, a moving shaft inserted through the core body so as to be directly moved and having an end, a plug formed integrally at the end side of the moving shaft so as to open and close the distal opening of the core body, a biasing member biasing the moving shaft so that the distal opening of the core body is closed by the plug, a cylindrical sealing member, an outer sealing portion formed integrally on the cylindrical sealing member and fitted with the outer periphery of the core body so as to be held between the core body and the inner wall of the throughbore thereby to adhere closely to the outer periphery of the core body, and an inner sealing portion formed integrally on the cylindrical sealing member so as to adhere closely to an outer face of the plug.

The above-described valve core includes the inner sealing portion sealing a gap between the distal opening of the core body and the plug and the outer sealing portion sealing a gap between the outer periphery of the core body and the inner wall of the throughbore. The inner and outer sealing portions are formed integrally on the cylindrical sealing member. Consequently, the number of parts can be reduced in the foregoing valve core as compared with the conventional ones. Moreover, since the cylindrical sealing member is fitted with the core body side, the structure of the moving shaft can be simplified and the number of parts can be reduced in the foregoing valve core, as compared with the conventional construction in which the rubber plug is provided on the moving shaft. Accordingly, for example, the valve core can be constructed by four discrete parts including the core body, the moving shaft, the cylindrical sealing member and an elastic member serving as the biasing member.

In a preferred form, the inner sealing portion protrudes forward from an end of the core body. Consequently, the inner sealing portion is pressed against the plug side due to pressure of a compressed fluid charged into the interior of the throughbore inner than the valve core, whereupon the sealing performance can be improved.

In another preferred form, the cylindrical sealing member is rotatably fitted with the core body. Consequently, when the valve core is screwed into the throughbore, the cylindrical sealing member is rotated relative to the core body, whereby sliding friction against the inner face of the throughbore can be reduced. Furthermore, the plug is prevented from being excessively pressed against the inner sealing portion by the abutment of the abutment positioning portions of moving shaft and core body.

In further another preferred form, the abutting taper provided at the moving shaft side and the abutting edge formed on the core body are abutted against each other, thereby providing the metal seal closing the distal opening of the core body. Thus, since a double sealing structure is provided by the foregoing metal seal and the seal by the cylindrical sealing member, the sealing performance can be improved.

In further another preferred form, the core body has a body positioning abutment which is formed on an outer face thereof so as to extend sidewise relative to a portion of the core body with which the cylindrical sealing member is fitted, the body positioning abutment being butted against the inner wall of the throughbore in a direction of insertion into the throughbore. In this construction, the body positioning abutment provided on the core body is butted against the inner wall of the throughbore when the valve core is inserted into the throughbore. The valve core is prevented from further insertion. Consequently, the outer sealing portion can be prevented from being excessively pressed against the inner wall of the throughbore, whereupon the sealing performance can be stabilized.

In further another preferred form, the biasing member comprises a compression coil spring inserted into a portion of the moving shaft protruding outward from the core body so as to be compressed between a spring stopper formed integrally with the end of the moving shaft and the end of the core body. Thus, since the compression coil spring serving as the biasing member is disposed outside the core body, the number of parts can be reduced in the above-described construction as compared with the case where the compression coil spring is disposed inside the core body.

In further another preferred form both valve core and plug have a pair of faces respectively formed parallel to each other, and the inner sealing member is disposed between the pair of faces.

The inner sealing portion is pinched and pressed between a pair of faces of the core body and the plug in a closed position. When pressure in the core mounting throughbore inner than a valve core is increased, pressing force of the faces against the inner sealing portion is increased, whereby the sealing performance can be stabilized.

Furthermore the inner sealing member has a pair of end faces abutting the faces of the core body and the plug respectively.

The faces of the core body and the plug abut a pair of the end faces of the inner sealing portion, whereby stress is prevented from being concentrated on the inner sealing portion. Consequently the inner sealing portion is prevented from being excessively deformed and durability is improved.

BRIEF DESCRIPTION OF THE DRAWINGS

Other objects, features and advantages of the present invention will become clear upon reviewing the following description of the embodiments, made with reference to the accompanying drawings, in which.

DETAILED DESCRIPTION OF THE INVENTION

Figure 1:
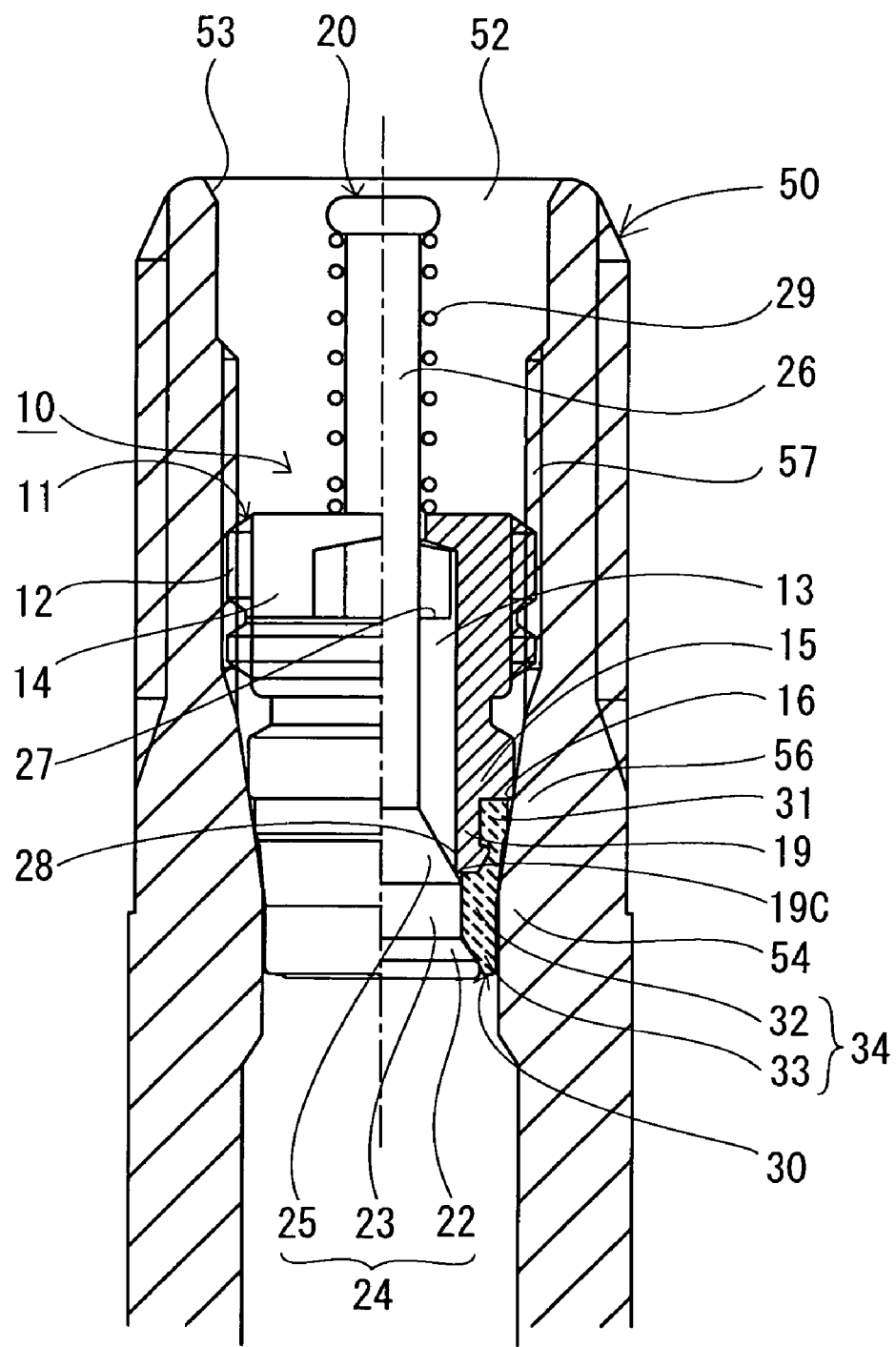
FIG. 1 is a sectional side view of the valve core in accordance with an embodiment of the present invention, the valve core being mounted in a core mounting throughbore.
Figure 2:
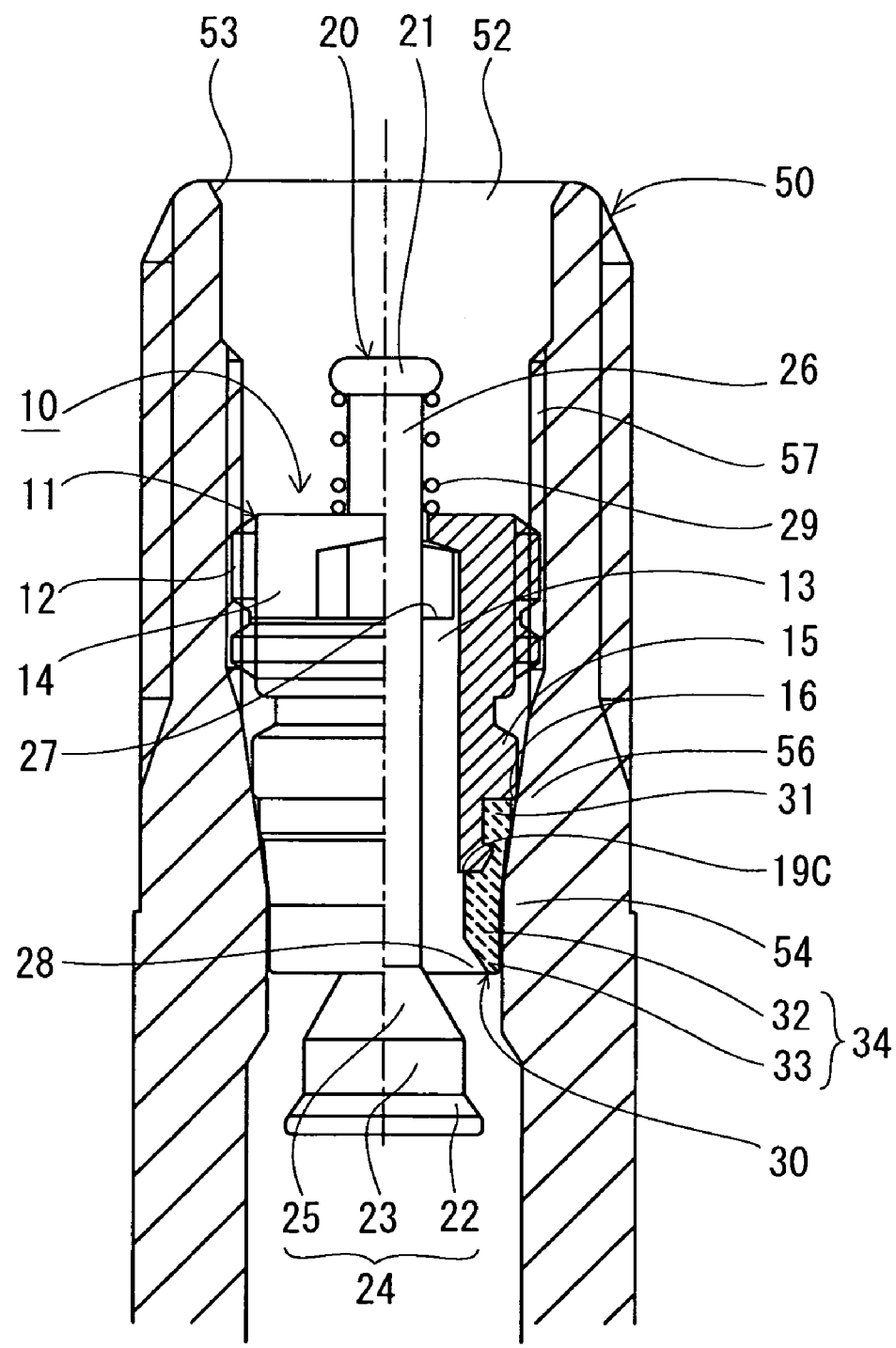
FIG. 2 is a sectional side view of the valve core in an open state.

An embodiment of the present invention will be described with reference to FIGS. 1 to 5. Referring to FIG. 1, reference numeral 50 designates a valve stem which is formed into the shape of a pipe. A core mounting throughbore 52 is defined in the valve stem 50. The throughbore 52 communicates with an interior of a tire (not shown), for example. The valve stem 50 has an upper charge opening 53 through which compressed air is supplied into the tire, as viewed in FIG. 1.

A female thread 57 is formed in an inner wall of the valve stem 50 near the charge opening 53. The valve stem 50 has a diameter-reduced portion 54 located inner than the female thread 57. The diameter-reduced portion 54 has a smaller diameter than the female thread 57. A stem side taper 56 is formed so as to be located between the female thread 57 and the diameter-reduced portion 54. The inner diameter of the taper 56 is gradually reduced toward the diameter-reduced portion 54. A valve core 10 of the invention is inserted through the charge opening 53 into the throughbore 52 to be threadedly engaged with the female thread 57.

Figure 3:
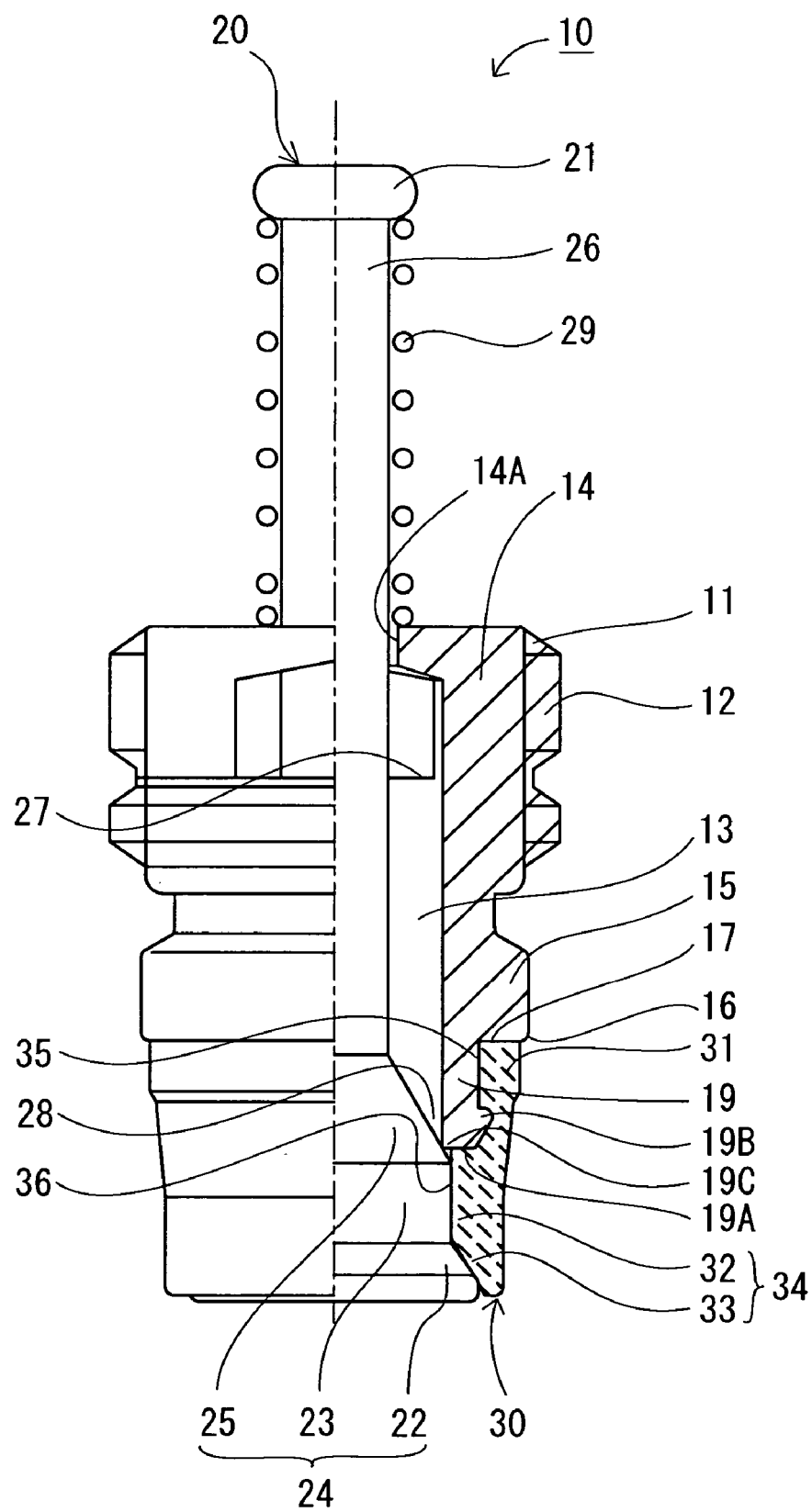
FIG. 3 is a sectional side view of the valve core.
Figure 4:
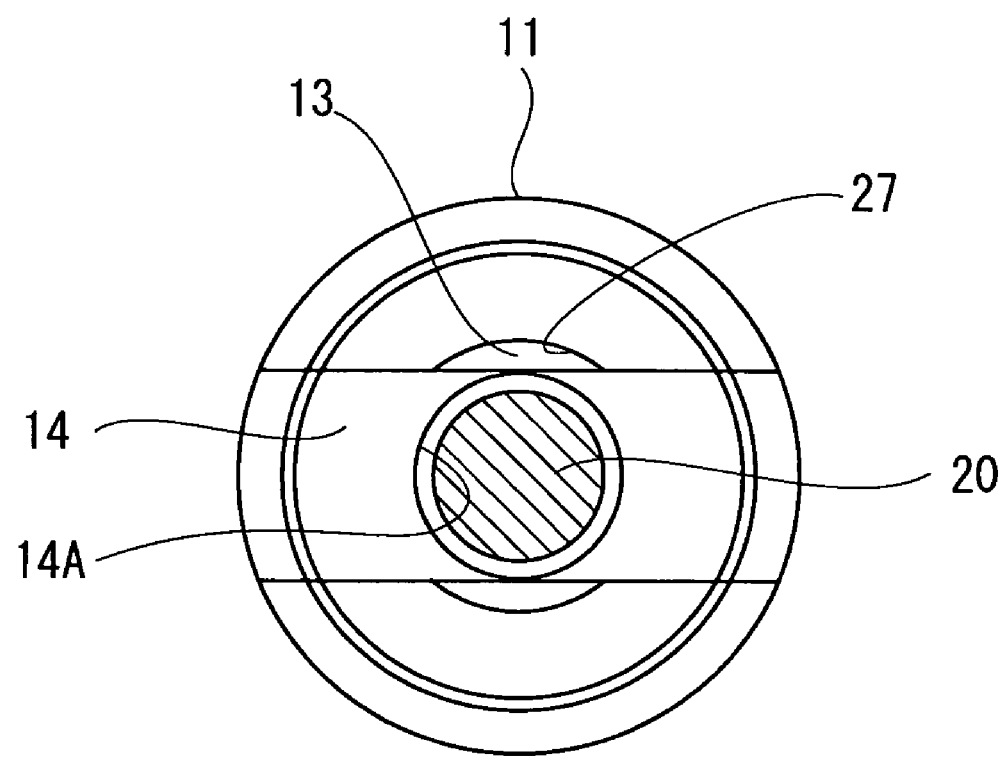
FIG. 4 is a plan view of the valve core.

The valve core 10 comprises four parts, that is, a core body 11, a moving shaft 20, a cylindrical sealing member 30 and a compression coil spring 29, as shown as an enlarged view in FIG. 3. The core body 11 is made of, for example, a metal having a hardness differing from the valve stem 50. The core body 11 is formed into a cylindrical shape and has a tapered distal end side in a direction of insertion into the throughbore 52. The core body 11 further has a central hole 13. The core body 11 has a proximal end formed with a bridge 14 extending across a proximal opening 27 of the central hole 13. Since the bridge 14 has a width smaller than an inner diameter of the opening 27 as shown in FIG. 4, part of the opening 27 is upwardly open. Furthermore, part of the opening 27 covered by the bridge 14 is open via a space below the bridge 14 to the throughbore 52.

A male thread 12 is formed on a proximal end of the cylindrical portion of the core body 11 and the bridge 14. The male thread 12 is adapted to engage the female thread 57 of the valve stem 50. The core body 11 has a distal end formed with a cylindrical sealing member fitting portion 19 having a smaller outer diameter than the other portion of the core body. A distal opening 28 is open at the distal end of the fitting portion 19. The distal end of the fitting portion 19 is formed with a sagittate portion 19B protruding outward gradually toward its rear. The fitting portion 19 has a distal face perpendicular to an axial direction of the core body 11. The distal face and an inner peripheral face of the central hole 13 intersect substantially at a right angle to each other, whereby an abutting edge 19C is formed. Furthermore, the core body 11 has a body positioning abutment 15 formed on a portion thereof nearer to the proximal end than the fitting portion 19. The body positioning abutment 15 has a larger outer diameter than the fitting portion 19, whereupon a stepped portion is formed between the abutment 15 and the fitting portion 19.

A portion of the bridge 14 intersecting a central line of the central hole 13 is formed with a shaft support hole 14A extending through the bridge as shown in FIG. 3. A moving shaft 20 extends through the shaft support hole 14A and the central hole 13. The moving shaft 20 is made of a metal having a hardness differing from the core body 11, for example. The moving shaft 20 includes a bar-like member 26, a plug 24 formed integrally on one of two ends of the bar-like member or a lower end as viewed in FIG. 3, and a spring stopper 21 formed integrally on the other end of the bar-like member. More specifically, for example, the bar-like member 26 with the plug 24 is forged and is then inserted into the core body 11. A compression coil spring 29 is provided around a portion of the bar-like member 26 projecting from the bridge 14. The spring stopper 21 is crimped on the end of the bar-like member 26. The spring 29 is stretched between the spring stopper 21 and the bridge 14 thereby to bias the moving shaft 20 to the bridge 14 side.

The plug 24 includes an abutting taper 25, a columnar portion 23 and a shaft side taper 22 all aligned axially. The columnar portion 23 has a larger diameter than the inner diameter of the central hole 13. The abutment taper 25 has such a tapered structure that the diameter thereof is gradually reduced from the columnar portion 23 toward the bar-like member 26. On the other hand, the shaft side taper 22 has such a tapered structure that the diameter thereof is gradually increased from the columnar portion 23 in the direction opposite the bar-like member 26. When the plug 24 is biased by the spring 29 toward the distal opening 28 of the core body 11, the middle portion of the abutment taper 25 abuts the abutment edge 19C of the core body as shown in FIG. 3. Since the metal made into the core body 11 has the hardness differing from that made into the moving shaft 20, a metal seal is provided by the abutment of the abutment taper 25 of the moving shaft 20 and the abutment edge 19C of the core body 11.

Figure 5:
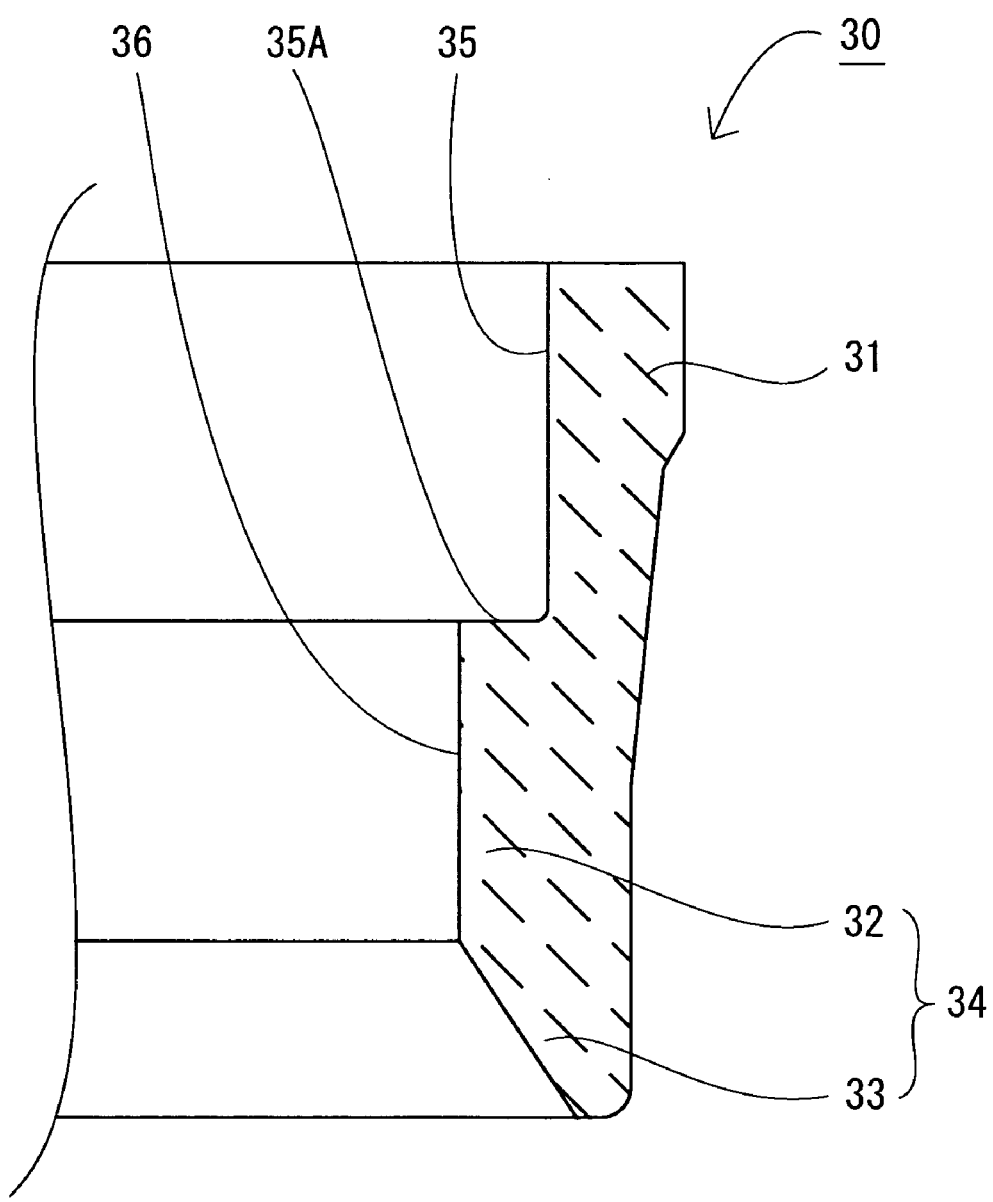
FIG. 5 is a sectional side view of a cylindrical sealing member.

FIG. 5 illustrates a sectional structure of the cylindrical sealing member 30 in a natural state. As shown in the figure, the cylindrical sealing member 30 has a larger diameter portion 35 and a smaller diameter portion 36 formed inside so as to be axially aligned. The fitting portion 19 of the core body 11 is fitted in the larger diameter portion 35 as shown in FIG. 3. A stepped portion 35A (see FIG. 5) is formed between the larger and smaller diameter portions 35 and 36. A distal end face 19A (see FIG. 3) of the fitting portion 19 is butted against the stepped portion 35A, and an end face of the larger diameter portion 35 side of the cylindrical sealing member 30 is butted against a stepped portion 17 between the body positioning abutment 15 and the fitting portion 19. As a result, the cylindrical sealing member 30 is positioned axially.

The cylindrical sealing member 30 has a proximal end serving as an outer sealing portion 31 with a larger outer diameter than the other portion thereof as shown in FIG. 5. The sealing member 30 further has a portion protruding ahead of the distal end face 19A of the core body 11 and serving as an inner sealing portion 34 adhering closely to the plug 24 of the moving shaft 20. The inner sealing portion 34 includes a cylindrical portion 32 with the aforesaid inwardly located smaller diameter portion 36 and a cylinder side tapered portion 33 formed by gradually spreading the open edge of the cylindrical portion 32 toward the opening.

The valve core 10 of the embodiment operates as follows. In order that the valve core 10 may be fixed in the throughbore 52, the valve core 10 is inserted into the throughbore 52 so that the female thread 57 of the throughbore is engaged with the male thread 12 of the valve core. With progress of the thread engagement of the male and female threads 57 and 12, the valve core 10 reaches an inner part of the throughbore 52, whereupon the inner sealing portion 34 of the cylindrical sealing member 30 enters the diameter-reduced portion 54, and the outer sealing portion 31 of the sealing member adheres closely to the inner wall (stem side tapered portion 56) of the throughbore 52, whereby a gap between the core body 11 and the inner face of the throughbore is sealed.

Since the cylindrical sealing member 30 is rotatably fitted with the core body 11, the member is prevented from sliding on the valve stem 50 and accordingly from being worn. Furthermore, even if the sealing member 30 is subjected to an axial force as the result of friction between the tapered portion 56 and itself, the end of the sealing member abuts the stepped portion 17 of the body positioning abutment 15, whereas the end of the core body 11 abuts the stepped portion 35A between the larger and smaller diameter portions 35 and 36.

When the threaded engagement between the male and female threads 12 and 57 progresses, the outer edge 16 of the abutment 15 abuts the stem side tapered portion 56, whereupon a metal seal is provided. Consequently, the gap between the outer face of the core body 11 and the inner face of the throughbore 52 is closed by a double seal, namely, the metal seal and the seal by means of the outer sealing portion 31.

Furthermore, the abutment of the outer edge 16 against the tapered portion 56 prevents a further screwing of the core body 11. As a result, the outer sealing portion 31 can be prevented from being excessively pressed against the inner wall of the throughbore 52 (stem side tapered portion 56), whereupon the sealing performance of the sealing member 30 is stabilized. Thus, attachment of the valve core 10 into the throughbore 52 is completed.

The plug 24 of the moving shaft 20 is subjected to a spring force of the compression coil spring 29 to be applied to the distal opening 28 of the core body 11, thereby being usually closed, as shown in FIG. 1. Compressed air is then charged through the throughbore 52 into the tire (not shown) as follows. For example, a charge pump is connected to the charge opening 53 of the valve stem 50 so that the compressed air is supplied through the through bore 52. The moving shaft 20 is directly moved by pressure of the supplied compressed air against the compression coil spring 29, whereupon a gap is defined between the plug 24 and the distal opening 28. As a result, the compressed air flows from the charge opening 53 side further into the throughbore 52.

The charge pump is disconnected from the charge opening 53 when the compressed air has been charged further into the throughbore 52. A spring force of the spring 29 and the pressure in the inner side of the throughbore 52 move the moving shaft 20 to the charge opening 53 side, so that the plug 24 recloses the distal opening 28.

More specifically, the plug 24 is pressed to the distal opening 28 side, so that the shaft side tapered portion 22 of the plug 24 adheres closely to the cylinder side tapered portion 33 of the inner sealing portion 34, whereby a gap between the distal opening 28 of the core body 11 and the plug is sealed. Additionally, since the cylindrical portion 23 of the plug 24 is fitted in the cylindrical portion 32 of the inner sealing portion 34, the cylindrical portion 32 is deformed by the inner pressure of the throughbore 52 so as to adhere closely to the columnar portion 23, whereby a seal is provided.

The abutment tapered portion 25 of the plug 24 abuts the abutting edge 19C of the core body 11 while the tapered portion 22 of the plug and the columnar portion 23 are adherent closely to the sealing member 30. As a result, the tapered portion 33 of the sealing member 30 can be prevented from being excessively pressed by the shaft side tapered portion 22 of the plug 24 and accordingly, the sealing performance can be stabilized. Since the metal made into the core body 11 has the hardness differing from that made into the moving shaft 20, a metal seal is provided by the abutment of the abutment taper 25 and the abutment edge 19C. More specifically, the gap between the distal opening 28 of the core body 11 and the plug 24 is closed by a double sealing structure, namely, the metal seal and the seal by means of the sealing member 30.

In the valve core 10 of the embodiment, the inner sealing portion 34 seals the gap between the distal opening 28 of the core body 11 and the plug 24, and the outer sealing portion 31 seals the gap between the outer face of the core body 11 and the inner wall of the throughbore 52 (stem side tapered portion 56). The inner and outer sealing portions 34 and 31 are formed integrally with the sealing member 30. Consequently, the number of sealing parts can be reduced in the valve core 10 of the embodiment as compared with the conventional valve cores. Moreover, since the sealing member 30 is fitted at the core body 11 side, seal pressing parts can be eliminated from the moving shaft 20, whereupon the structure of the moving shaft can be simplified and the number of parts can be reduced. Additionally, since the compression coil spring 29 is disposed outside the core body 11, the number of parts can be reduced as compared with the case where the compression coil spring is provided inside the core body. Consequently, the valve core 10 can be composed of four discrete parts, namely, the core body 11, the moving shaft 20, the sealing member 30 and the compression coil spring 29.

Figure 6:
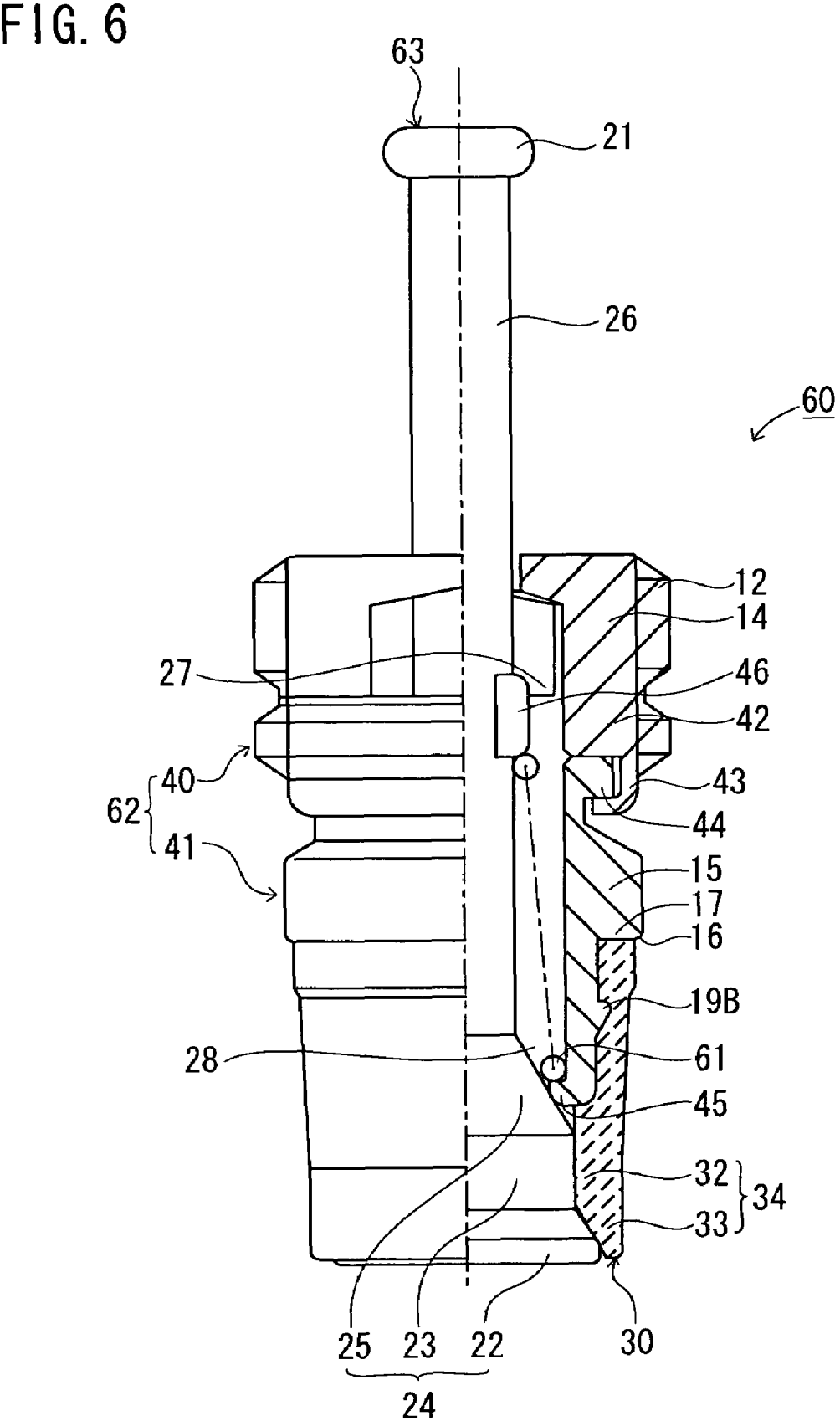
FIG. 6 is a sectional side view of the valve core in accordance with a second embodiment of the present invention.

FIG. 6 illustrates a second embodiment of the invention. The valve core 60 of the second embodiment differs from the first embodiment in that a compression coil spring 61 is enclosed in the core body 62. The following describes only the differences of the second embodiment from the first one. The identical or similar parts in the second embodiment are labeled by the same reference symbols as those in the first embodiment, and the description of these parts will be eliminated.

The core body 62 in the second embodiment is dividable at an axial middle into a first body portion 40 and a second body portion 41. The first body portion 40 constituting a proximal end side of the core body 62 includes the male thread 12 and the bridge 14 as described above. The first body portion 40 has an end face opposite the bridge 14. A thin cylindrical portion 43 protrudes from the end face of the first body part 40. On the other hand, the second body portion 41 constituting the distal end side of the core body 62 includes a locking flange 44 extending sidewise from an end thereof at the first body portion 40 side. The locking flange 44 is inserted into an inside space of the cylindrical portion 43 to be abutted against an inner face of the cylindrical portion. In this state, the distal end of the cylindrical portion 43 is bent to the backside of the flange 44, whereby the first and second body portions 40 and 41 are joined together.

The second body portion 41 has a distal opening 28 with an inner edge from which a spring locking wall 45 extends inward. The moving shaft 63 includes a spring locking protrusion 46 protruding sidewise from an axial middle. The compression coil spring 61 has a conical spring structure in which a winding diameter is gradually increased from one end side toward the other end side. The compression coil spring 61 is enclosed in the second body portion 41 and a larger diameter side end of the spring is engaged with the spring locking wall 45 while the moving shaft 63 is inserted in the core body 62 through the distal opening 28. A spring locking protrusion 46 is formed on the middle of the bar-like member 26 by crimping. The first body portion 40 is then joined to the second body portion 41, and the spring locking portion 21 is formed on the distal end of the moving shaft 63 by crimping. As a result, the moving shaft 63 is biased upward as viewed in FIG. 6, and the plug 24 closes the distal opening 28 of the core body 62.

The same effect can be achieved from the above-described valve core 60 as from the valve core 10 of the first embodiment. Furthermore, since the first body portion 40 is rotatable relative to the second body portion 41, wear between the sealing member 30 and the throughbore 52 is prevented, whereby the sealing performance can be stabilized.

The valve core 100 of a third embodiment of the invention will be described with reference to FIGS. 9 to 11. The following describes only the differences of the third embodiment from the first one. The identical or similar parts in the third embodiment are labeled by the same reference symbols as those in the first embodiment, and the description of these parts will be eliminated.

Figure 11:
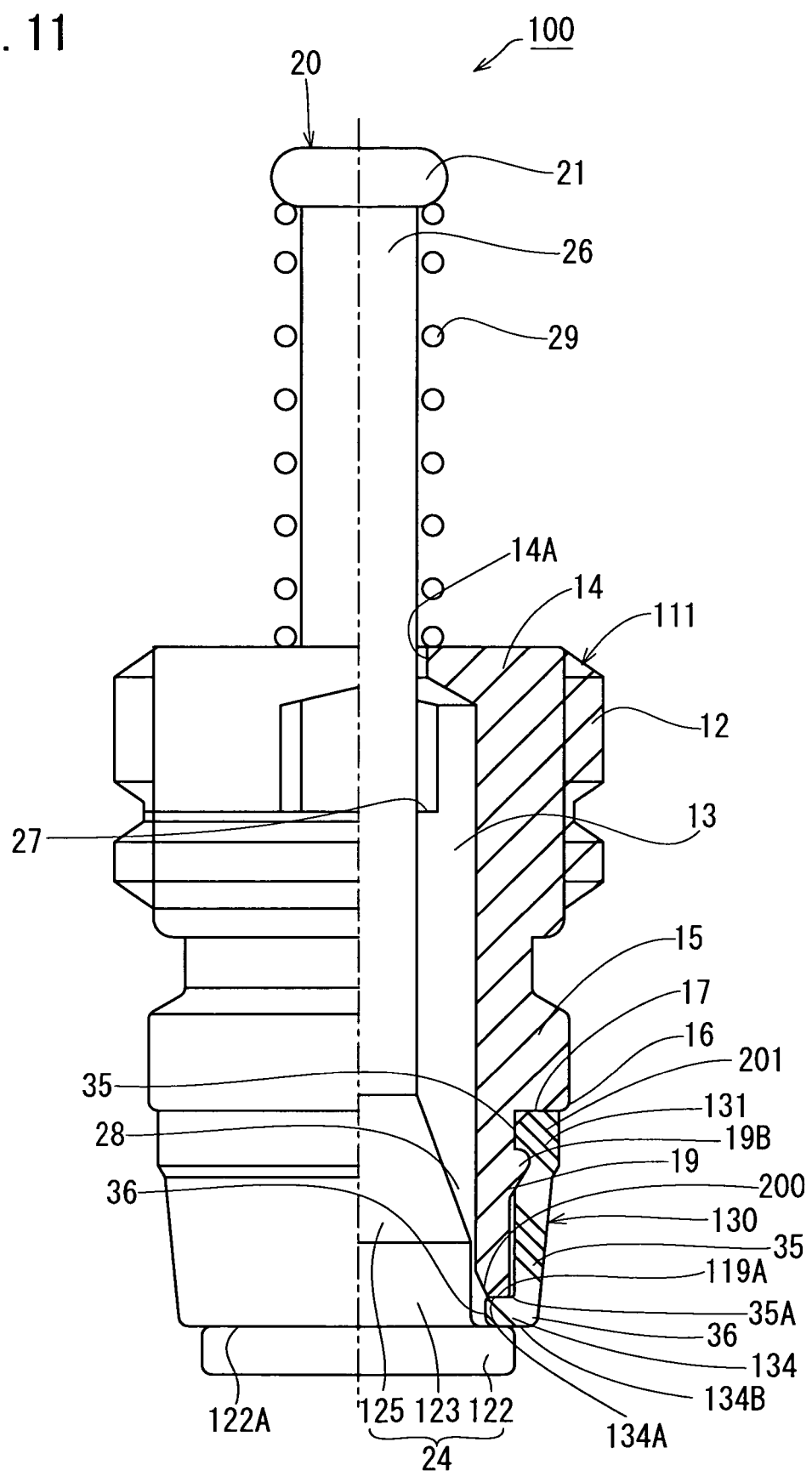
FIG. 11 is a enlarged sectional side view of the valve core.
Figure 12:
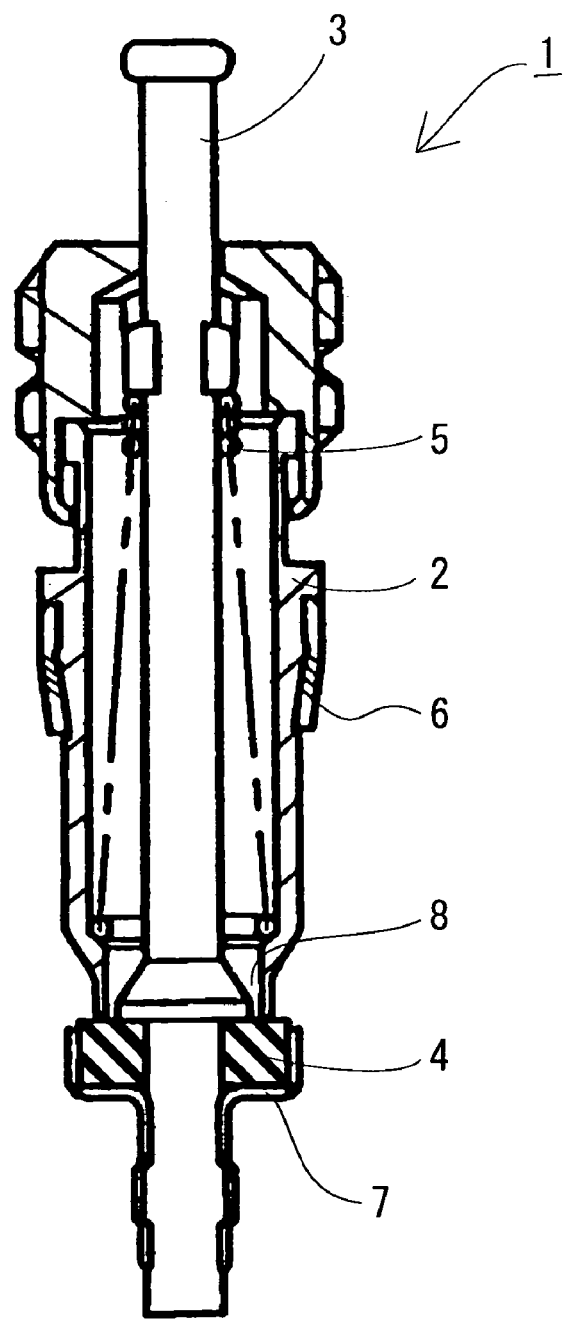
FIG. 12 is a sectional view of a conventional valve core.

The valve plug 24 of the moving shaft 20 in the third embodiment includes a tapered portion 125, a columnar portion 123 and a flange 122 as shown in FIG. 11. The valve plug 24 has such a structure that the flange 122 protrudes sidewise from one end of the columnar portion 123 which is capable of being inserted into a core body 111. The flange 122 has a pressing face 122A which is parallel to a distal end face 119A of the core body 111, more specifically to the distal end face 119A of the cylindrical sealing member fitting portion 19.

The columnar portion 123 has the other end opposite the flange 122. The tapered portion 125 is formed on the end so as to guide the plug 24 into the core body 111. Furthermore, the core body 111 has a tapered portion 200 on an inner edge of a distal opening. The tapered portion 200 guides the plug 24 into the core body 111.

A cylindrical sealing member 130 in the third embodiment has a cylindrical outer sealing portion 131 and an annular inner sealing portion 134. The inner sealing portion 134 extends inward from one end of the outer sealing portion 131. The outer sealing portion 131 has a distal end opposite the inner sealing portion 134. A terminal end portion 201 having a slightly larger outer diameter than the other portion of the outer sealing portion 131 is formed on the distal end. The cylindrical sealing member fitting portion 19 has a sagittate portion 19B formed on a portion near the proximal end thereof. The cylindrical sealing member 130 is prevented from falling off from a cylindrical sealing member fitting portion 19 with the sagittate portion 19B being engaged with the terminal end portion 201.

The inner sealing member 134 has a pair of end faces 134A and 134B extending toward axis and being parallel to each other. A distal end face 119A of the cylindrical sealing member fitting portion 19 generally abuts the end face 134A of the inner sealing portion 134. The flange 122 of the valve 24 abuts the other end face 134B of the inner sealing portion 134 in a closing position as viewed in FIG. 9 or the flange 122 departs from the end face 134B in opening position as viewed in FIG. 10. The inner peripheral face of the inner sealing portion 134 is positioned near the boundary between the distal end face 119A and the moving shaft 20. Consequently, the tapered portion 125 and the columnar portion 123 can be moved into and out of the core body 111 without being interfered with the inner sealing portion 134.

Figure 9:
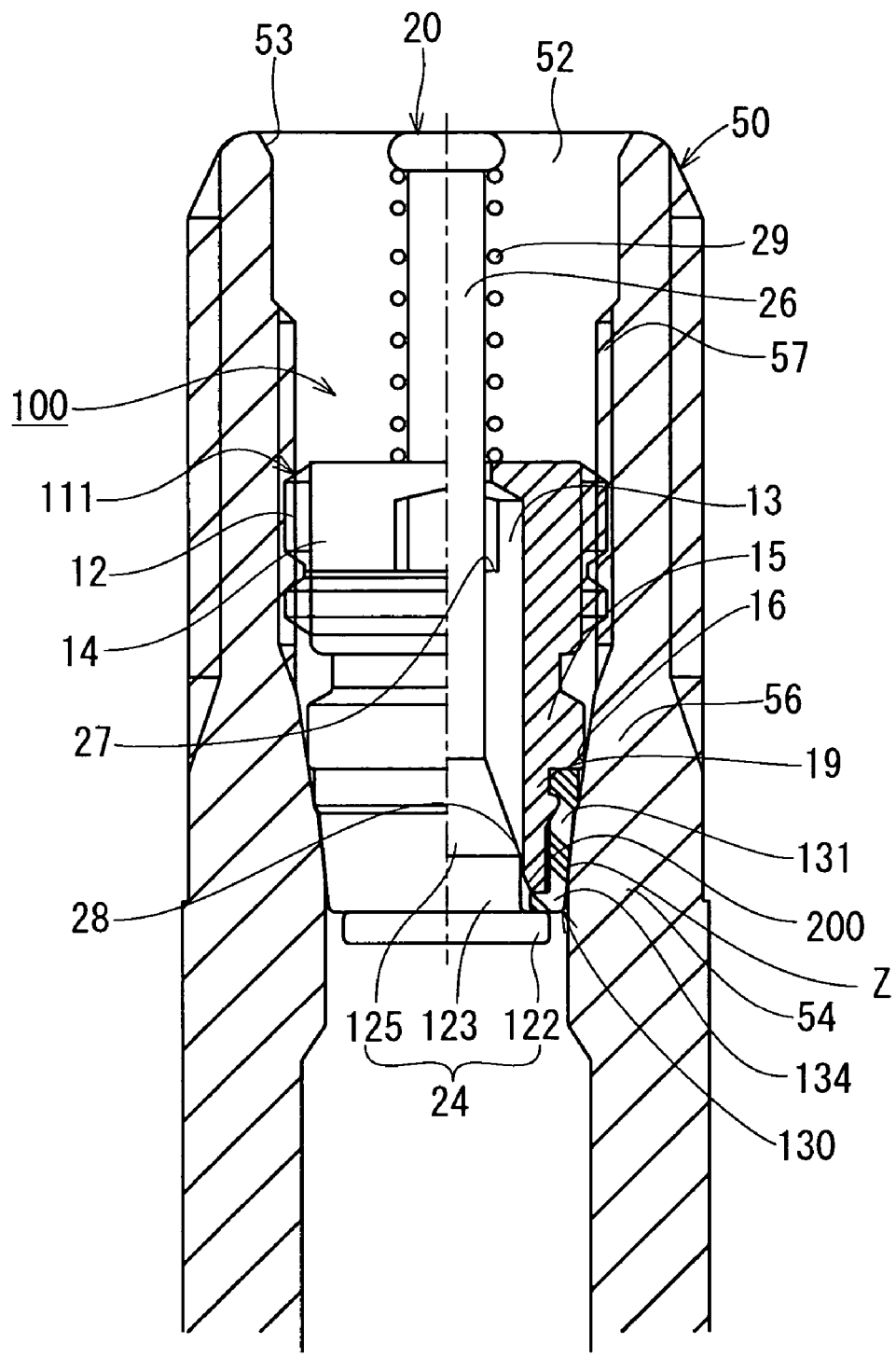
FIG. 9 is a sectional side view of the valve core in accordance with a third embodiment of the present invention.
Figure 10:
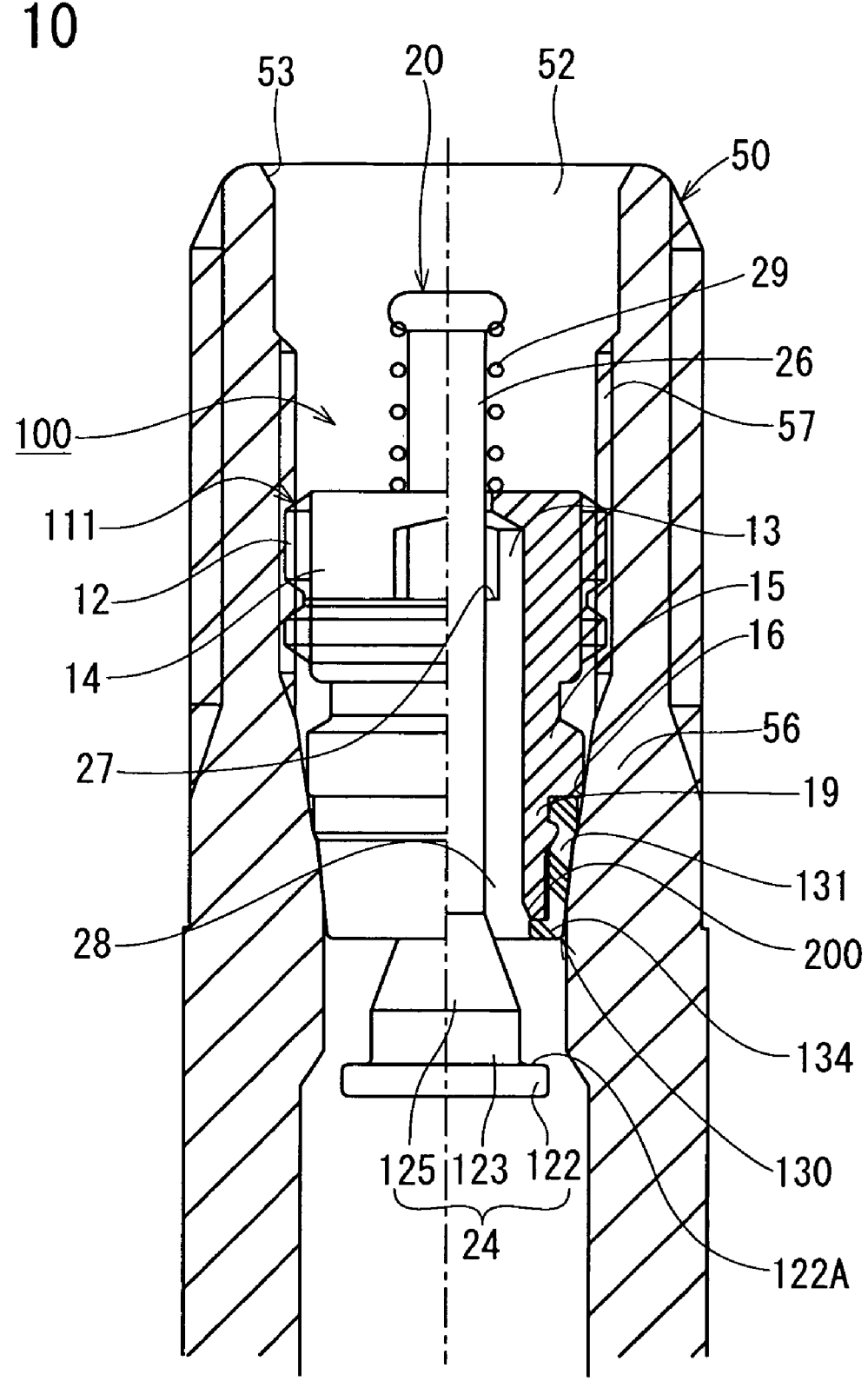
FIG. 10 is a sectional side view of the valve core in an open state.

When the valve core 100 is inserted into the core mounting throughbore 52 of the valve stem 50 as shown in FIG. 9, a part of the outer sealing portion 131 (a part Z) of the cylindrical sealing portion 130 is pinched and pressed between the diameter-reduced portion 54 of the valve stem 50 and the cylindrical sealing member fitting portion 19. Consequently, a gap between the core body 111 and the inner face of the throughbore 52 is sealed.

Furthermore, the flange 122 of the moving shaft 20 is generally subjected to a spring force of the compression coil spring 29 to be drawn toward the core body 111 side, whereby the inner sealing portion 134 is pinched between the pressing face 122A of the flange 122 and the distal end face 119A of the core body 111. When pressure in the core mounting throughbore 52 inner than a valve core 100 is increased, pressing force of the flange 122 against the inner sealing portion 134 is increased, whereby the sealing performance can be stabilized. Furthermore, both pressing face 122A of the flange 122 and the distal end face 119A abut the end faces 134A and 134B respectively, stress is prevented from being concentrated on the inner sealing portion 134, whereby the inner sealing portion 134 is prevented from being excessively deformed and durability is improved.

When the fluid, for example a compressed air is supplied from the charge opening 53 into the throughbore 52, or when the moving shaft 20 is operated by pressing force from the charge opening 53 side, the flange 122 is departed from the inner sealing portion 134 and the distal opening 28 of the core body 111 is opened. Consequently, the compressed air is capable of passing through the valve core 100.

Modified forms will be described. In the valve cores 10 of the first embodiment, the metal made into the core body 11 has the hardness differing from that made into the moving shaft 20, so that the metal seal is provided. However, the moving shaft 20 and the core body 11 may only abut each other so as to be positioned, and metal seal may not be provided.

Figure 7:
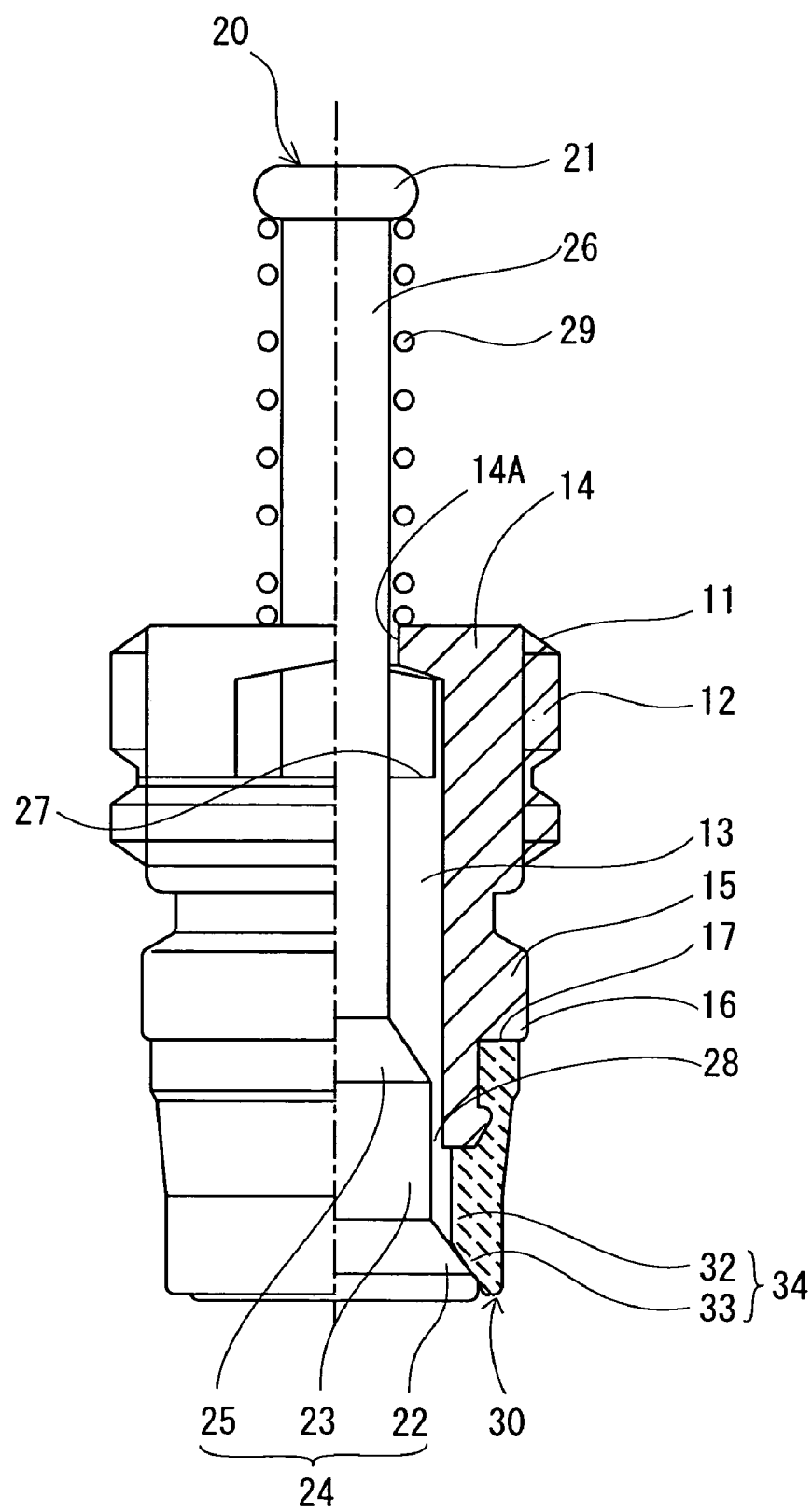
FIG. 7 is a sectional side view of a modified form 1.

Furthermore, the distal opening 28 of the core body 11 may be closed only by the abutment of the shaft side taper 22 of the plug 24 and the cylinder side taper 33 of the cylindrical sealing member 30 without abutment of the plug 24 and the core body 11, as shown in FIG. 7.

In the foregoing embodiments, the male thread 12 of the valve core 10 or 60 threadedly engages the female thread 57 in the throughbore 52 so that the valve core is prevented from falling off. However, a threadedly engaging member discrete from the valve core may be provided so that the valve core is prevented by the threadedly engaging member from falling off after the valve core has been inserted into the throughbore.

Furthermore, the valve core may be fixed in the throughbore by means of a suitable adhesive agent, force fitting or other locking means.

Figure 8:
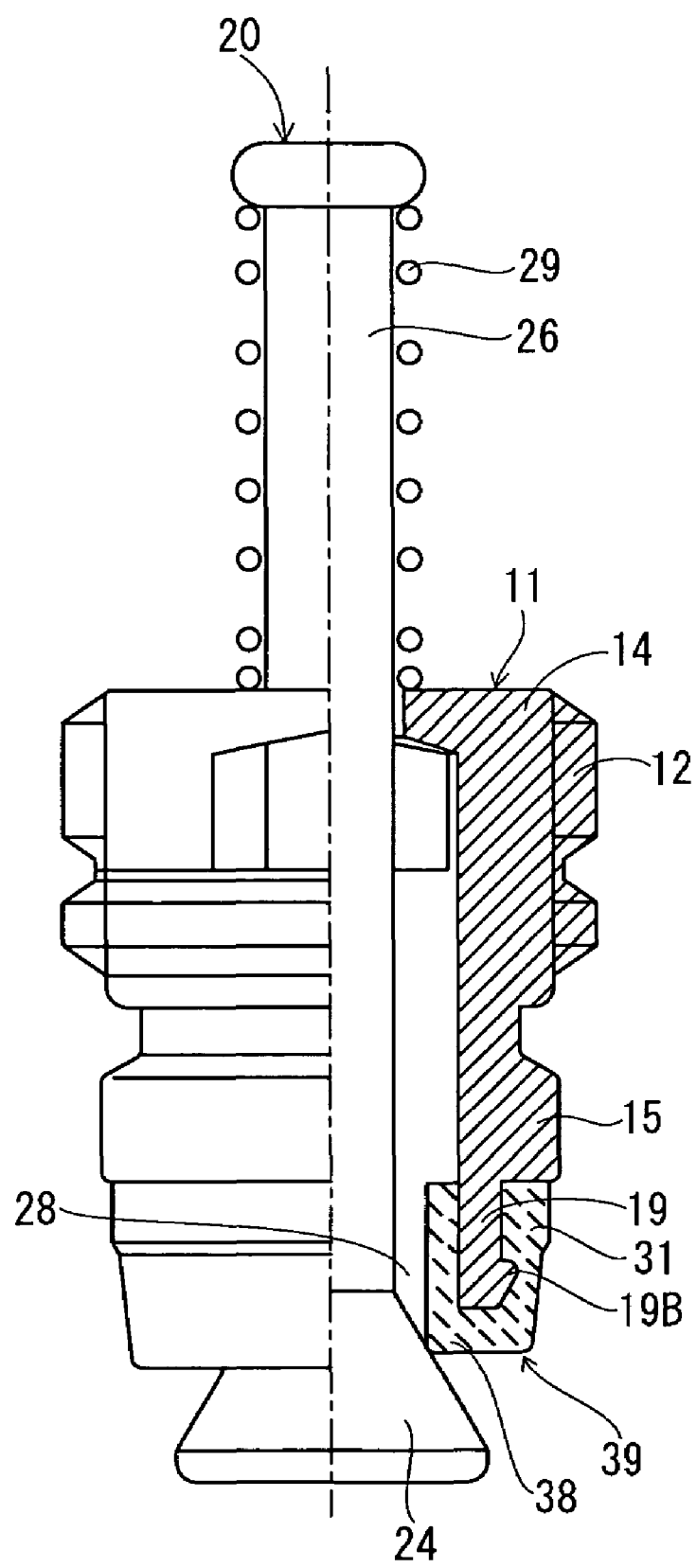
FIG. 8 is a sectional side view of a modified form 2.

In the first embodiment, the inner sealing portion 34 of the cylindrical sealing member 30 protrudes forward from the core body 11. However, as shown as the cylindrical sealing member 39 in FIG. 8, the inner sealing portion 38 may be laid on the inside of the distal opening 28 of the core body 11 so that the plug 24 adheres closely to the inner sealing portion.

In the foregoing embodiments, the valve core of the invention is used to close and open a flow path of compressed air. However, the usage of the valve core should not be limited to this. The valve core may be used for a flow path of any fluid, for example, nitrogen, oxygen or air conditioner refrigerant.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A valve core for opening and closing a core mounting throughbore, comprising:
    a cylindrical core body fixed inside the throughbore and having a distal opening;
    a moving shaft inserted through the core body so as to be directly moved and having an end;
    a plug formed integrally at the end side of the moving shaft so as to open and close the distal opening of the core body;
    a biasing member biasing the moving shaft so that the distal opening of the core body is closed by the plug;
    a cylindrical sealing member;
    an outer sealing portion formed integrally on the cylindrical sealing member and fitted with the outer periphery of the core body so as to be held between the core body and the inner wall of the throughbore thereby to adhere closely to the outer periphery of the core body; and
    an inner sealing portion formed integrally on the cylindrically sealing member so as to adhere closely to an outer face of the plug, the inner sealing portion including a cylindrical portion with a distal end and a cylinder side taper formed by gradually spreading a distal end side inner diameter of the cylindrical portion, and the plug includes a columnar portion fitted into the cylindrical portion of the inner sealing portion and a shaft side taper adhering closely to the cylinder side taper.

2. A valve core according to claim 1, wherein, the cylindrical sealing member is rotatably fitted within the core body.

3. A valve core according to claim 1, wherein the moving shaft and the core body include respective abutment positioning portions abutting each other while the plug is adherent to the inner sealing portion.

4. A valve core according to claim 1, wherein the core body has a body positioning abutment which is formed on an outer face thereof so as to extend sidewise relative to a portion of the core body with which the cylindrical sealing member is fitted, the body positioning abutment being butted against the inner wall of the throughbore in a direction of insertion, into the throughbore.

5. A valve core according to claim 1, wherein the cylindrical sealing member includes a larger diameter portion and a smaller diameter portion both arranged axially, the core body is fitted in the larger diameter portion, and the core body has an end face butted against a stepped portion between the larger and smaller diameter portions.

6. A valve core according to claim 1, wherein the biasing member comprises a compression coil spring inserted into a portion of the moving shaft protruding outward from the core body so as to be compressed between a spring stopper formed integrally with the end of the moving shaft and the end of the core body.

7. A valve core according to claim 1, wherein the core body, the moving shaft, the cylindrical sealing member and an elastic member serving as the biasing member are formed into four discrete parts.

8. A valve core according to claim 1, wherein both the valve core and the plug have a pair of faces respectively formed parallel to each other, and the inner sealing member is disposed between said pair of faces.

9. A valve core for opening and closing a core mounting throughbore, comprising:
    a cylindrical core body fixed inside the throughbore and having a distal opening;
    a moving shaft insered through the core body so to be directly moved and having an end;
    a plug formed integrally at the end side of the moving shaft so as to open an at the end side of the moving shaft so as to open and close the distal opening of the core body;
    a biasing member biasing the moving shaft so that the distal opening of the core body is closed the plug;
    a cylindrical sealing member;
    an outer sealing portion formed integrally on the cylindrical sealing member and fitted with the outer periphery of the core body so as to be held between the core body and the inner wall of the throughbore thereby to adhere closely to the outer periphery of the core body; and
    an inner sealing portion formed integrally on the cylindrical sealing member so as to adhere closely to an outer face of the plug, the inner sealing portion protruding forward from an end of the core body and including a cylindrical portion with a distal end and a cylinder side taper formed by gradually spreading a distal end side inner diameter of the cylindrical portion, and the plug includes a columnar portion fitted into the cylindrical portion of the inner sealing portion and a shaft side taper adhering closely to the cylinder side taper.

10. A valve core for opening and closing a core mounting throughbore, comprising:
    a cylindrical core body fixed inside the throughbore and having a distal opening;
    a moving shaft inserted through the core body so as to be directly moved and having an end;
    a plug formed integrally at the end side of the moving shaft so as to open and close the distal opening of the core body;
    a biasing member biasing the moving shaft so that the distal opening of the core body is closed by the plug;
    a cylindrical sealing member;

an outer sealing portion formed integrally on the cylindrical sealing member and fitted with the outer periphery of the core body so as to be held between the core body and the inner wall of the throughbore thereby to adhere closely to the outer periphery of the core body; and an inner sealing portion formed integrally on the cylindrical sealing member so as to adhere closely to an outer face of the plug, wherein the moving shaft and the core body include respective abutment positioning portions abutting each other while the plug is adherent to the inner sealing portion.

11. A valve core according to claim 10, wherein the inner sealing portion protrudes forward from an end of the core body.

12. A valve core according to claim 10, wherein:

the moving shaft is made of a metal having a hardness differing from a hardness of a metal made into the core body;

the abutment positioning portion at the moving shaft side includes an abutting taper formed by tapering a part of the plug so that a diameter thereof is gradually reduced toward an inner side of the core body;

the abutment positioning portion at the core body side includes an abutting edge formed at an opening edge of the core body having a cylindrical structure; and the abutting taper and the abutting edge provide a metal seal therebetween.

13. A valve core according to claim 10, wherein the core body has a body positioning abutment which is formed on an outer face thereof so as to extend sidewise relative to a portion of the core body with which the cylindrical sealing member is fitted, the body positioning abutment being butted against the inner wall of the throughbore in a direction of insertion into the throughbore.

14. A valve core according to claim 12, wherein the core body has a body positioning abutment which is formed on an outer face thereof so as to extend sidewise relative to a portion of the core body with which the cylindrical sealing member is fitted, the body positioning abutment being butted against the inner wall of the throughbore in a direction of insertion into the throughbore.

15. A valve core according to claim 10, wherein the cylindrical sealing member includes a larger diameter portion and a smaller diameter portion both arranged axially, the core body is fitted in the larger diameter portion, and the core body has an end butted against a stepped portion between the larger and smaller diameter portions.

16. A value core according to claim 12, wherein the cylindrical sealing member includes a larger diameter portion and a smaller diameter portion both arranged axially, the core body is fitted in the larger diameter portion, and the core body has an end face butted against a stepped portion between the larger and smaller diameter portion.

17. A valve core according to claim 10, wherein the biasing member comprises a compression coil spring inserted into a portion of the moving shaft protruding outward from the core body so as to be compressed between a spring stopper formed integrally with the end of the moving shaft and the end of the core body.

18. A valve core according to claim 12, wherein the biasing member comprises a compression coil spring inserted into a portion of the moving shaft protruding outward from the core body so as to be compressed between a spring stopper formed integrally with the end of the moving shaft and the end of the core body.

19. A valve core according to claim 10, wherein the core body, the moving shaft, the cylindrical sealing member and an elastic member serving as the biasing member are formed into four discrete parts.

20. A valve core according to claim 12, wherein the core body, the moving shaft, the cylindrical sealing member and an elastic member serving as the biasing member are formed into four discrete parts.

21. A valve core according to claim 10, wherein both the valve core and the plug have a pair of faces respectively formed parallel to each other, and the inner sealing member is disposed between said pair of faces.

22. A valve core according to claim 12, wherein both the valve core and the plug have a pair of faces respectively formed parallel to each other, and the inner sealing member is disposed between said pair of faces.

23. A valve core for opening and closing a core mounting throughbore, comprising:

a cylindrical core body fixed inside the throughbore and having a distal opening;

a moving shaft inserted through the core body so as to be directly moved and having an end;

a plug formed integrally at the end side of the moving shaft so as to open and close the distal opening of the core body;

a biasing member biasing the moving shaft so that the distal opening of the core body is closed by the plug;

a cylindrical sealing member rotatably fitted within the core body;

an outer sealing portion formed integrally on the cylindrical sealing member and fitted with the outer periphery of the core body so as to be held between the core body and the inner wall of the throughbore thereby to adhere to the outer periphery of the core body; and an inner sealing portion formed integrally on the cylindrical sealing member so as to adhere closely to an outer face of the plug, wherein the moving shaft and the core body include respective abutment positioning portions abutting each other while the plug is adherent to the inner sealing portion.

24. A valve core for opening and closing a core mounting throughbore, comprising:

a cylindrical core body fixed inside the throughbore and having a distal opening;

a moving shaft inserted through the core body so as to be directly moved and having an end;

a plug formed integrally at the end side of the moving shaft so as to open and close the distal opening the core body;

a biasing member biasing the moving shaft so that the distal opening of the core body is closed by the plug;

a cylindrical sealing member rotatably fitted within the core body;

an outer sealing portion formed integrally on the cylindrical sealing member and fitted with the outer periphery of the core body so as to be held between the core body and the inner wall of the throughbore thereby to adhere closely to the outer periphery of the core body; and an inner sealing portion formed integrally on the cylindrical sealing member so as to adhere closely to an outer face of the plug, wherein the core body has a body positioning abutment which is formed on an outer face thereof so as to extend sidewise relative to a portion of the core body with which the cylindrical sealing member is fitted, the body positioning abutment being butted against the inner wall of the throughbore in a direction of insertion into the throughbore.

25. A valve core for opening and closing a core mounting throughbore, comprising:

a cylindrical core body fixed inside the throughbore and having a distal opening;

a moving shaft inserted through the core body so as to be directly moved and having an end;

a plug formed integrally at the end side of the moving shaft so as to open and close the distal opening of the core body;

a biasing member biasing the moving shaft so that the distal opening of the core body is closed by the plug;

a cylindrical sealing member rotably fitted within the core body and including a larger diameter portion and a smaller diameter portion both arranged axially, the core body being fitted in the larger diameter portion, and the core body having an end face butted against a stepped portion between the larger and smaller diameter portions;

an outer sealing portion formed integrally on the cylindrical sealing member and fitted with the outer periphery of the core body so as to be held between the core body and the inner wall of the throughbore thereby to adhere closely to the outer periphery of the core body; and an inner sealing portion formed integrally on the cylindrical sealing member so as to adhere closely to an outer face of the plug.

26. A valve core for opening and closing a core mounting throughbore, comprising:

a cylindrical core body fixed inside the throughbore and having a distal opening;

a moving shaft inserted through the core body so as to be directly moved and having an end;

a plug formed integrally at the end side of the moving shaft so as to open and close the distal opening of the core body;

a biasing member biasing the moving shaft so that the distal opening of the core body is closed by the plug;

a cylindrical sealing member;

an outer sealing portion formed integrally on the cylindrical sealing member and fitted with the outer periphery of the core body so as to be held between the core body and the inner wall of the throughbore thereby to adhere closely to the outer periphery of the core body; and an inner sealing portion formed integrally on the cylindrical sealing member so as to adhere closely to an outer face of the plug, wherein both the valve core and the plug have a pair of faces respectively formed parallel to each other, and the inner sealing member is disposed between said pair of faces.

* * * * *